3,325,343
ABLATIVE REINFORCED PLASTIC ARTICLE AND METHOD OF MAKING SAME

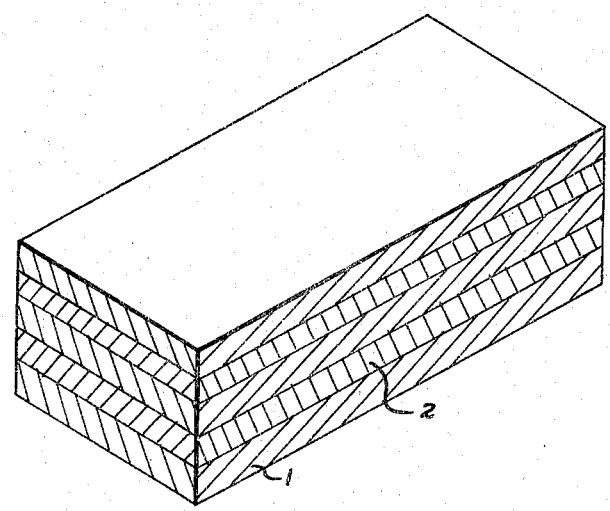
INVENTOR.
RALPH L. HOUGH

Ralph L. Hough, Springfield, Ohio, assignor to the United States of America as represented by the Secretary of the Air Force
Filed Dec. 3, 1963, Ser. No. 327,851
4 Claims. (Cl. 161—184)

The invention described herein may be manufactured and used by or for the United States Government for governmental purposes without payment to me of any royalty thereon.

This invention relates to a laminated article of manufacture and to the process by which it is made.

High temperature abrasion forces encountered by rocket nose cones, the inside surface of jet engine skirts, the leading edge of aircraft wings used on re-entry into the atmosphere, heat shields, and the like, are destructive of materials previously available.

The present invention provides a new and improved article of manufacture that retains its integrity structurally and operatively when subjected to abrasion forces at high temperatures.

In the accompanying drawing is shown a fragment of the ablative reinforced plastic that embodies the present invention.

In the drawing, the fragment of the article of manufacture comprises successive laminae of zirconia foil 1, flake, flat wire, or the like, alternated with a plastic 2.

The article of manufacture is made by assembling a stack of zirconium foil; each foil being of a thickness of about $10^{-3}$ to $10^{-4}$ inch. The zirconium may be stabilized with magnesium oxide, calcium oxide, or the like, as desired. The stack of foil is placed in a furnace of, illustratively, the muffle or the tube type. The furnace and its charge is swept clean of air with a mixture of from 1 to 10 volumes of oxygen in argon and this furnace atmosphere is maintained during the heating cycle of the process.

The furnace is maintained at a desired temperature, and, illustratively, within the range of from 1600° F. to 2600° F., and preferably at about 1900° F., until the zirconium is converted to zirconia throughout the foil structure. After the furnace has attained temperature, the heating is continued for 30 seconds or longer. The furnace with its charge is then cooled to room temperature of about 75° F.

The resultant zirconia foil, that is of low thermal conductivity, is then impregnated with a desired resin within a vacuum of about $10^{-5}$ mm. Hg.

Illustratively, the zirconia foil, flake, wire, or the like, is made into a sheet by placing a desired plurality of sheets of zirconia in a pan within a furnace that can be evacuated, and causing a liquid solution of an epoxy resin to drip into the pan to the saturation of the zirconia foil with the plastic. A suitable plastic is the thermosetting commercial epoxy resin on page 1559 of the Handbook of Chemistry and Physics, 43d edition, published by The Chemical Rubber Publishing Company, Cleveland, Ohio. The plastic solvent in vapor form is drawn away from the zirconia laminae by vacuum pumps, by an increase in temperature, or by both. The resultant product comprises laminae of zirconia foil of low thermal conductivity, alternated with layers of a preferred resin or plastic. The last of the solvent is removed by raising the temperature of the furnace above the solvent boiling point.

It will be apparent that, where desired, the zirconia foil, flake, wire, or the like, is placed within a pair of matched dies, the fluid plastic solution is introduced between the foils, and the plastic solvent is withdrawn from the evacuated container, with or without an increase in temperature to assist the removal of the solvent.

The product at this stage of its production is subjected to compression and heat to consolidate its structure to a desired degree. The degree of compression is adequate for causing the removal of all voids and to virtually die cast the end product to exact desired dimensions.

This is a disclosure of an illustrative and successfully operative embodiment of the present invention. Similar structural and functional modifications of the parts of the article of manufacture and of the process steps described may be made without departing from the present invention.

I claim:

1. The ablative reinforced plastic composition article of manufacture that comprises a plurality of laminae of zirconia foil in layer sheet form and impregnated with a resin, alternated with a plurality of laminae of plastic material that are securely bonded together into a consolidated body.

2. The reinforced plastic defined by the above claim 1 wherein the zirconia foil is of a thickness of about $10^{-3}$ inch.

3. The reinforced plastic defined by claim 1 wherein the plastic is thermosetting commercial epoxy resin.

4. The process of making an ablative reinforced plastic composition article of manufacture by introducing into a furnace a desired charge consisting of layer sheets of zirconium foil of a thickness of about $10^{-3}$ to $10^{-4}$ inch, sweeping the inside of the furnace and its charge with a mixture of from one to ten volumes of oxygen in argon, adjusting the furnace controls to a temperature within the range of from 1600° F. to 2600° F., maintaining the furnace at temperature to the conversion of the layer sheets of zirconium into zirconia substantially throughout the foil structure and then cooling the furnace and its charge, impregnating the resultant layer of sheets of zirconia foil with a resin within a vacuum maintained at about $10^{-5}$ mm. Hg by dripping a solution of epoxy resin on the zirconia foil and drawing away the epoxy resin solvent vapor in alternating the zirconia foil with the epoxy resin in a laminae body, and compressing the laminae body to a desired degree of compactness.

References Cited
UNITED STATES PATENTS

| | | | |
|---|---|---|---|
| 2,806,509 | 9/1957 | Bozzacco et al. | 161—161 |
| 2,828,236 | 3/1958 | West | 161—186 X |
| 2,858,451 | 10/1958 | Silversher | 250—108 |
| 3,016,580 | 1/1962 | Jaeschke | 264—263 |

EARL M. BERGERT, *Primary Examiner.*

HAROLD ANSHER, *Examiner.*